United States Patent
Blazek et al.

(10) Patent No.: US 9,588,825 B2
(45) Date of Patent: *Mar. 7, 2017

(54) SYSTEM AND METHODS OF COMMUNICATING EVENTS BETWEEN MULTIPLE APPLICATIONS

(71) Applicant: Lexmark International Technology Sàrl, Genèva (CH)

(72) Inventors: Shane Evan Blazek, Shawnee, KS (US); Kristopher John Andrew Haney, Olathe, KS (US)

(73) Assignee: Lexmark International Technology Sàrl, Genève (CH)

(*) Notice: Subject to any disclaimer, the term of this patent is extended or adjusted under 35 U.S.C. 154(b) by 0 days.

This patent is subject to a terminal disclaimer.

(21) Appl. No.: 14/588,088

(22) Filed: Dec. 31, 2014

(65) Prior Publication Data

US 2016/0117204 A1    Apr. 28, 2016

Related U.S. Application Data

(63) Continuation of application No. 14/526,173, filed on Oct. 28, 2014.

(51) Int. Cl.
  *G06F 9/44* (2006.01)
  *G06F 9/54* (2006.01)

(52) U.S. Cl.
  CPC .................. *G06F 9/542* (2013.01)

(58) Field of Classification Search
  None
  See application file for complete search history.

(56) References Cited

U.S. PATENT DOCUMENTS

| | | | |
|---|---|---|---|
| 2008/0294502 A1* | 11/2008 | Broome | G06Q 10/02 705/5 |
| 2011/0053672 A1* | 3/2011 | Gagner et al. | 463/16 |
| 2012/0026535 A1* | 2/2012 | Rovner et al. | 358/1.15 |
| 2013/0007766 A1* | 1/2013 | Kim | G06Q 10/10 719/313 |
| 2014/0304356 A1* | 10/2014 | Allen, Sr. | H04W 8/24 709/213 |
| 2015/0150147 A1* | 5/2015 | Keohane | G06F 21/6209 726/28 |

OTHER PUBLICATIONS

David C. Luckham "Complex Event Processing inDistributed Systems", 1998.*

* cited by examiner

*Primary Examiner* — Lechi Truong
*Assistant Examiner* — Abdou Seye
(74) *Attorney, Agent, or Firm* — Zilka-Kotab, PC

(57) ABSTRACT

A system and methods of communicating events includes detecting, on a code space of an application, an event at the application; transmitting the detected event from the application to an embedded application, the embedded application being embedded in the application; and triggering the detected event on an event aggregator of the embedded application based upon data associated with the detected event.

4 Claims, 3 Drawing Sheets

SYSTEM AND METHODS OF COMMUNICATING EVENTS BETWEEN MULTIPLE APPLICATIONS

CROSS REFERENCE TO RELATED APPLICATIONS

Pursuant to 35 USC §120, this application is a continuation application and claims the benefit of the earlier filing date of U.S. patent application Ser. No. 14/526,173, filed on Oct. 28, 2014, entitled "System and Methods of Communicating Events Between Multiple Applications", the contents of which is hereby incorporated by reference herein in its entirety. This patent application is also related to U.S. patent application Ser. No. 14/526,191, entitled "System and Methods of Broadcasting Events Between Multiple Applications", filed on Oct. 28, 2014, and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present disclosure relates to communicating events between applications, and more particularly, to communicating events between a host application and one or more embedded applications therein.

2. Description of the Related Art

Event-driven applications wait for a user's actions or changes in a system (collectively known as "events") prior to performing an operation. Typically, events are raised or triggered by code running in an application while event listeners or subscribers listen for these events and may execute operations in response to the events detected.

An event aggregator, such as an event sink, contains the logic for managing event subscriptions and event publications. Event aggregators may be utilized for routing events from event sources, such as event publishers, to its subscribers. Managing event subscriptions may include monitoring, tracking, adding and/or removing subscribers.

Event sources or publishers raise or trigger an event to occur in an application. For example, an event source may be code that triggers an event by executing code on or belonging to an event source data object. The data object may be, for example, an element in a graphical user interface of the application such as a button, a textbox, or a link. The event source may notify the subscribers of the application of the triggered events, and a subscriber may perform a specific operation or a program function in response to the raised event. For example, the publisher may notify subscribers of an application of changes entered in a document, and a subscriber may use the notification raised by the event source to trigger another event, such as saving the changes to a memory of the computing system, updating a database entry with the changes raised, or other like events.

Existing event-driven applications may be written in more than one programming language and may have different technologies that lie therein. Thus, it is sometimes challenging to embed one application into another application. For example, when an application written for the web is integrated into a desktop application, the web application may not be able to communicate well with the desktop application from which it is hosted since web applications are typically written in a different programming language and/or utilize a different technology to those of desktop applications. Sometimes an event that occurs may need to be acted upon by both the host application and the embedded application, regardless of the code space from which the event has been triggered. Code space, as used herein, includes a set of computer instructions resident in memory that is managed by an application. Regardless of whether the host and embedded applications share the same technology or language, there may be issues, inefficiencies and/or difficulties in communicating the event between both applications. In current systems, an application may also have at least one application embedded therein, thereby increasing the possibility of miscommunication.

Accordingly, there is a need for a system and methods of communicating an event between a host application and its embedded application(s). There is also a need for a method for more efficiently triggering an event from the host application to the embedded application(s) and vice-versa.

SUMMARY

A system and methods for communicating events between applications written in different languages and/or utilizing differing technologies are disclosed.

In one example embodiment, a method of communicating events between applications is disclosed. The method includes detecting, on a code space of an application, an event at the application; transmitting the detected event from the application to an embedded application, the embedded application being embedded in the application; and triggering the detected event on an event aggregator of the embedded application based upon data associated with the detected event.

In a second example embodiment, a method of communicating events includes receiving at an embedded application embedded in an application an event detected at the application and triggering the detected event on an event aggregator of the embedded application based upon data associated with the event.

In some example aspects, the data associated with the detected event is an identifier of the event.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

Figure 1:
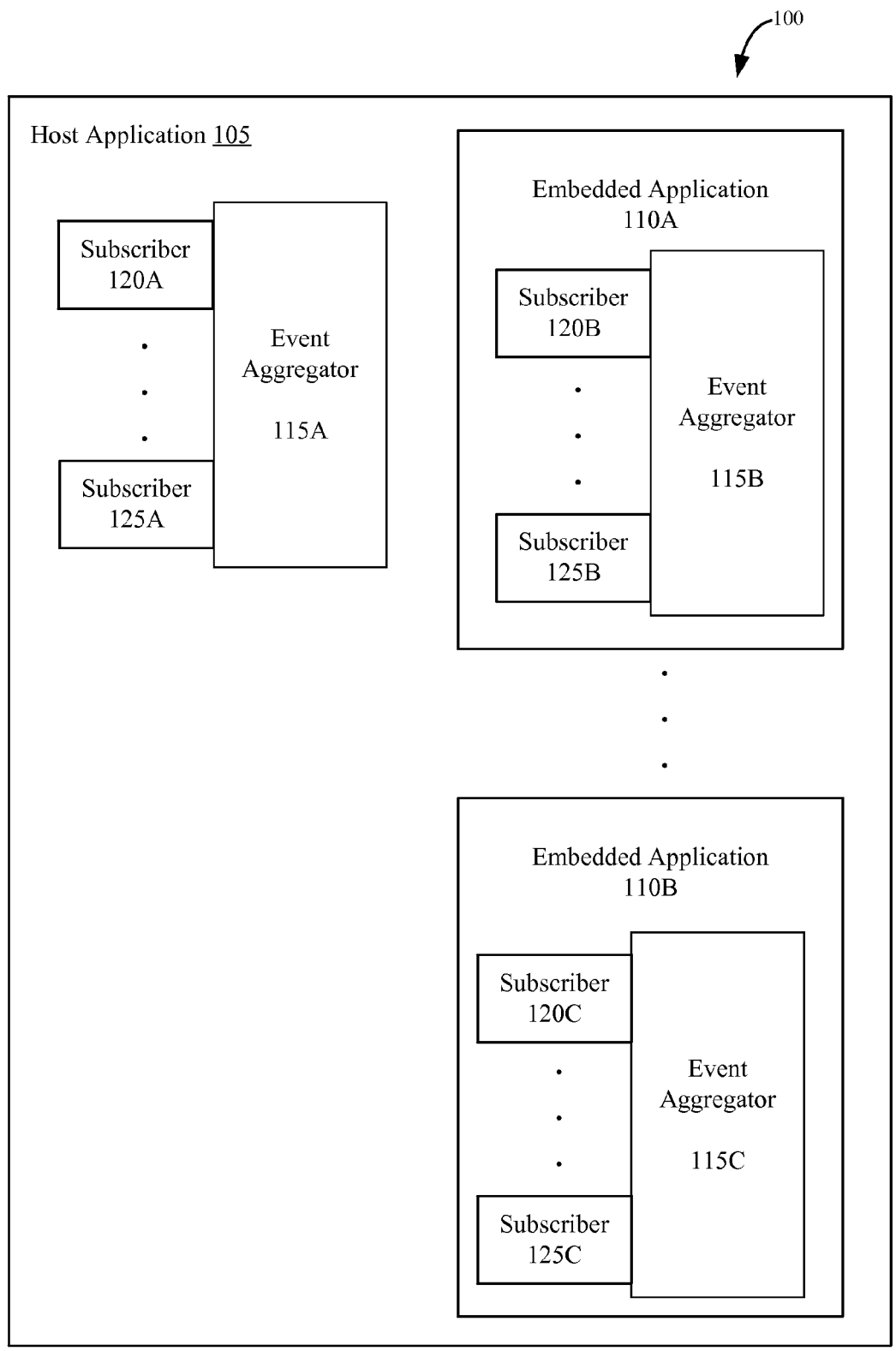
FIG. 1 shows a block diagram of one example embodiment of a system for communicating events between a host application and one or more embedded applications.

The following description and drawings illustrate example embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the descriptions below.

These computer program instructions may also be stored in a non-transitory computer-readable memory that may direct a computer or other programmable data processing apparatus to function in a particular manner, such that the instructions stored in the computer-readable memory produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus implement the function specified in the block or blocks.

Accordingly, the blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special-purpose hardware-based computer systems that perform the specified functions or steps or combinations of special-purpose hardware and computer instructions.

Disclosed are a system and methods of communicating events between a host application and one or more applications embedded therein. A host application is any application that is running on a device. An embedded application is any application separate from the host application that communicates with the host application and may run within the same process of the host application. The embedded application may be written in the same or a different coding language as the host application. In some example embodiments, the embedded application may also be a second instance of the host application.

Each of the host application and the one or more embedded applications may include an event aggregator for handling the events. The events may be triggered from either the host application or an embedded application. Operations may be performed in response to the events. Examples of an operation may include, but are not limited to, displaying data from the event to a user, updating a user interface, communicating with a server, prompting a user for information, reading a file, closing a file, logging to a file or indicating an error (e.g., providing an error message).

For purposes of the present disclosure, an event may be one or more activities in an application. An event may be, for example, a user-generated action, such as the clicking of a button, entering of characters, selection on a form, opening a document, clicking of a link, and the like. An event may also be an occurrence on the application and/or on the system on which the application is executing, such as, for example, a decrease in memory, a change in a state of the databases, a delay in an operating system process, or an error in a request or network communication. An event may be triggered by another event. In one aspect, the event may be a change in state of data or properties of the application. For example, the event may be a user action, an error notification, a completion of a long running action, a response received from a server or database, a file closed, or an operating system notification received, among others.

FIG. 1 shows a block diagram of one example embodiment of a system 100 for communicating events between a host application 105 and one or more embedded applications, illustrated as embedded applications 110A and 110B. Host application 105, embedded application 110A, and embedded application 110B may each include an event aggregator 115A, 115B, and 115C, respectively. Host application 105, embedded application 110A, and embedded application 110B may each include at least one subscriber 120A, 120B, and 120C, respectively. In some example embodiments, at least one of host application 105, embedded application 110A, and embedded application 110B do not contain any subscribers.

Host application 105 may be any application executed on a particular computing platform in a computing device. The computing device may be, for example, a personal computer, a laptop computer, a workstation computer. In some example aspects, the computing device may be a handheld or pocket-sized mobile or portable device such as, for example, a mobile telephone, a smart phone, a personal digital assistant, a tablet computer, an e-book reader, or other similar device.

In some example aspects, host application 105 may be an application executed on an operating system of the computing device. In other example aspects, host application 105 may be an application executed on a browser accessed through the computing device, such as a web application. In yet other example aspects, host application 105 may be an application executed on an imaging device. The imaging device may be, for example, a multi-function product that performs multiple functions, such as printing, e-mailing, scanning, copying, and/or faxing. The imaging device may include an operating panel for accessing host application 105.

Host application 105 may be written in any programming language appropriate for the computing platform on which it may be executed. For example, host application 105 may be designed to run in a Microsoft Windows®, an Apple OSX, or an Android™ operating system environment. In some example aspects, host application 105 may be designed to run in a browser, such as in an HTML web page and the like.

Embedded applications 110A, 110B may be applications embedded in and/or hosted by host application 105. Embedded applications 110A, 110B may be included as one or more modules on host application 105. In one example aspect, embedded applications 110A, 110B may be written in a programming language different to that of host application 105 and/or written for a different computing platform, and embedded application 110A may also be written in a programming language different from the programming language of embedded application 110B. In other example aspects, host application 105 and/or embedded applications 110A, 110B may be written in the same language and/or for a different platform. In yet the same or other example aspects, host application 105 and/or embedded applications 110A, 110B may not share any code or variables within the computing system or device within which they are executing.

Embedded application 110A may not be able to directly communicate or share data with embedded application 110B. However, host application 105 may communicate with both embedded applications 110A, 110B, as is typical in host systems.

In some example aspects, embedded applications 110A, 110B may be activated and/or launched once host application 105 is executing on the computing device. In other example aspects, embedded applications 110A, 110B may be activated and/or launched prior to executing host application 105. Embedded applications 110A, 110B may be connected to a network such as the web and be an embedded web application. For example, embedded applications 110A, 110B may be Adobe® Flash® applications, Java™ applets, Silverlight® applications, HTML inline frames (iframes), embedded web browsers or the like.

Event aggregators 115A, 115B, and 115C may be one or more program instructions for managing events raised in the application in which it is integrated. Each of event aggregators 115A, 115B, and 115C may be written in the same or a different programming language as the application in which it is integrated. As is typical with event aggregators, event aggregators 115A, 115B, and 115C may be communicatively coupled with one or more event sources (not shown) and one or more of its subscribers.

For example, event aggregator 115A may be communicatively coupled to subscribers 120A-125A; event aggregator 115B may be communicatively coupled with subscribers 120B-125B; and event aggregator 115C may be communicatively coupled with subscribers 120B-125C.

Each of event aggregators 115A, 115B, and 115C may include one or more program instructions for notifying its subscribers 120A-125A, 120B-125B, and 120C-125C, respectively, of the events raised by the event source(s). Event aggregators 115A, 115B, and 115C may further include program instructions for triggering an event on host application 105, embedded application 110A, and/or embedded application 110B, respectively.

Subscribers 120A-125A, 120B-125B, and 120C-125C may each include one or more program instructions communicatively coupled with event aggregators 115A, 115B, and 115C, respectively, for detecting one or more events.

In some example embodiments, subscribers 120A-125B, 120B-125B, 120C-125C may specify which event or events each wants to subscribe to or receive from respective event aggregators 115A, 115B, 115C. Specifying which event to receive from event aggregators 115A, 115B, 115C may include specifying or otherwise indicating an identifier or a property of an event that the subscriber wishes to receive. By way of example, but not limitation, if host application 105 was an electronic content system, subscriber 120A may specify to event aggregator 115A that subscriber 120A wants to receive an event or notification when a file is modified, and subscriber 125C may specify to event aggregator 115A that it wants to receive an event or notification when a new file is created. In such an example, subscriber 120A specifies that it wishes to receive from event aggregator 115A events labeled or having an identifier "EditEvent", and subscriber 125A specifies that it desires to receive events labeled "CreateEvent".

Subscribers 120A, 120B, and 120C may also include one or more program instructions for processing and/or responding to the raised events. For example, subscriber 120A may include instructions for an operation, such as a program function, which may be executed in response to an event on host application 105. In one example aspect, subscriber 120A may include a program function for closing a web page accessed by a user once an event indicating that the user clicked or depressed a "Sign Out" button has been raised on host application 105. In another example aspect, subscriber 120A may include a program function for displaying an image once an upload event has been triggered by host application 105.

It will also be appreciated by those skilled in the art that in some other example embodiments, the application on which an event is initially triggered may not have an event aggregator and/or not every application to which an event is being communicated requires an event aggregator. For example, in some example embodiments where an event is triggered on host application 105, event aggregator 115B or event aggregator 115C may be omitted, and in other example embodiments where an event is triggered in embedded application 110A or embedded application B, only event aggregator 115A of host application 105 is required.

Figure 2:
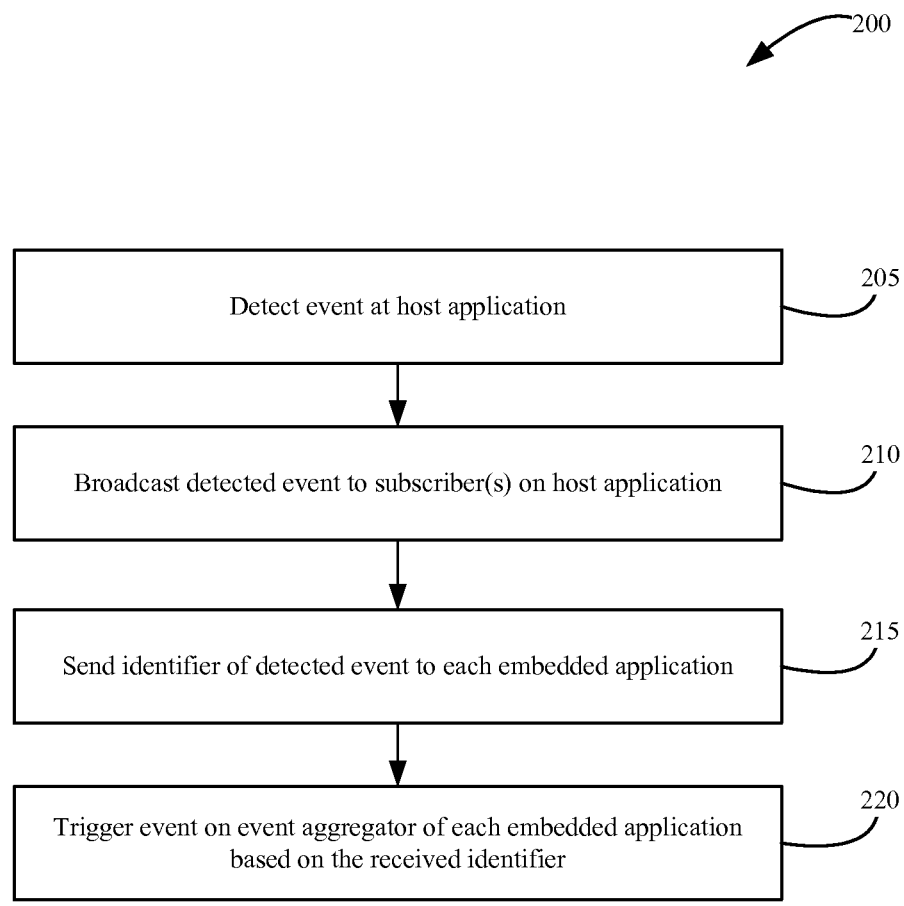
FIG. 2 shows one example flowchart of a method of communicating an event triggered from the host application to the embedded applications in the example system of FIG. 1.

FIG. 2 shows one example flowchart of a method 200 for communicating an event triggered from host application 105 to embedded applications 110A, 110B. Communicating the event from host application 105 to embedded applications 110A, 110B informs embedded applications 110A, 110B of the event detected or initially triggered on host application 105, allowing both host application 105 and embedded applications 110A, 110B to respond or react to the detected event.

For illustrative purposes, host application 105 may be an application written in C# language, and embedded applications 110A, 110B may be an HTML page in an embedded web browser and an Adobe® Flash® application, respectively. Activity, such as user input, may be initially detected from any of the application in C# language, the HTML page, and the Adobe® Flash® application, as is typical in event-driven applications. The application may be configured to receive an event, such as notification of a user input, for sending to both the HTML page and the Adobe® Flash® application.

At block 205, event aggregator 115A may detect an event on a code space of host application 105. The code space may be, for example, an area in the code of host application 105 which includes program functions that are exclusive to host application 105. For instance, the code space of host application 105 may be a portion having the C# code and excluding the programming languages for embedded applications 110A, 110B.

Detecting the event on host application 105 may include determining an identifier of the event, such as a name of the event. For example, event aggregator 115A may detect the occurrence of an event having "KeyboardEvent" as an identifier, which is triggered by a user entering characters in a field, such as a name field, of host application 105. In some example aspects, event aggregator 115A may also obtain data upon detection of the event. Data may be, for example, the alphanumeric characters or other input entered by the user into host application 105. In some example aspects, event aggregator 115A may also temporarily store the data obtained in a storage location, such as in a remote server or in a memory space associated with the computing device and owned by neither host application 105 or embedded applications 110A, 110B. Such stored data may then be retrieved and/or used by embedded applications 110A and 110B.

At block 210, event aggregator 115A of host application 105 may broadcast the detected event by notifying subscribers 120A-125A on host application 105 of the event. In some example aspects, event aggregator 115A of host application 105 may also broadcast the data associated with the detected event.

In one alternative example embodiment, event aggregator 115A of host application first determines which subscribers 120A-125 are registered or configured to receive the broadcast of the detected event and then broadcasts the detected event and/or data associated with the detected event only to those subscribers 120A-125A which are registered or configured to receive the broadcast of the detected event. The determining may be performed by event aggregator 115A identifying which of subscribers 120A-125A, connected to event aggregator 115A, have specified to receive the event based on at least one of an identifier or a property of the event. Upon determining which of subscribers 120A-125A have registered to receive the event, event aggregator 115A may broadcast the event only to subscribers 120A-125A. For example, if the identifier is "KeyboardEvent," event aggregator 115A may broadcast the "KeyboardEvent" event only those subscribers 120A-125A which have specified to receive events having "KeyboardEvent" as the identifier.

Subscribers 120A-125A which are registered or configured to receive the broadcast of the detected event may then execute operations in response to the detected event. For example, if event aggregator 115A broadcasts an event identifier "KeyboardEvent" to which subscriber 120A is registered or configured to receive, then subscriber 120A may execute instructions to store the received data (e.g., new characters entered by the user) to a memory of the computing device, update a database with an entry including the new characters, or the like, in response to the event detecting the new characters being entered.

As a result of the detected event being triggered on event aggregator 115A, host application 105 may send the identifier of the detected event to embedded applications 110A, 110B, respectively, within host application 105 (block 215). Sending the identifier of the detected event informs every embedded application 110A, 110B of the event initially triggered on host application 105, allowing every embedded application 110A, 110B to trigger an event on its respective event aggregator 115B, 115C based on the received identifier. In one example aspect, host application 105 may also send the data obtained with the detected event to embedded applications 110A, 110B. For example, host application 105 may send the identifier "KeyboardEvent" and the input received from the user to the HTML page and to the Adobe® Flash® application.

At block 220, embedded applications 110A, 110B may receive the identifier and/or the data obtained on host application 105 upon the detection of the event. Once the detected event is triggered on event aggregators 115B, 115C of embedded applications 110A, 110B, respectively, the detected event may be handled by subscribers 120B-125B, 120C-125C in their respective code spaces based on the received identifier.

Triggering the event may include event aggregators 115B, 115C broadcasting the triggered event to each of its subscribers 120B-125B, 120C-125C, respectively. For example, event aggregators 115B and 115C each notifies respective subscribers 120B-125B and 120C-125C of the triggered event. Subscribers 120B-125B and 120C-125C registered or configured to receive the triggered event may then execute operations in response to the triggered event. For example, subscriber 120B in embedded application 110A may display the data obtained from event aggregator 115A of host application 105, such as in a text box field, upon receipt of the event "KeyboardEvent" identifier. Subscriber 120C on embedded application 110B may also display an image based on the received "KeyboardEvent" identifier, such as an image including a "Success" text. It will be appreciated by those skilled in the art that other operations may be executed on embedded applications 110A, 110B in response to the triggered event.

In one alternative example embodiment, at least one of event aggregators 115B, 115C of embedded application 110A, 110B, respectively, may determine which of subscribers 120B-125B, 120C-125C are configured to receive the triggered event before broadcasting the triggered event. For example, event aggregator 115B may determine which subscribers 120B-125B are registered to receive the event detected from host application 105. The determining may be performed by event aggregator 115B identifying which of subscribers 120B-125B have specified to receive, based on at least one of the identifier or a property of the detected event, the triggered event. Upon determining which of subscribers 120B-125B have registered to receive the event, event aggregator 115B may broadcast the event to subscribed subscribers 120B-125B.

It will be appreciated by those skilled in the art that the broadcasting of the detected event to subscribers 120A-125A and/or the execution of operations by subscribed subscribers 120A-125A in response to the detected event may occur before, after or simultaneously with the sending of the identifier of the detected event from host application 105 to embedded applications 110A, 110B.

Figure 3:
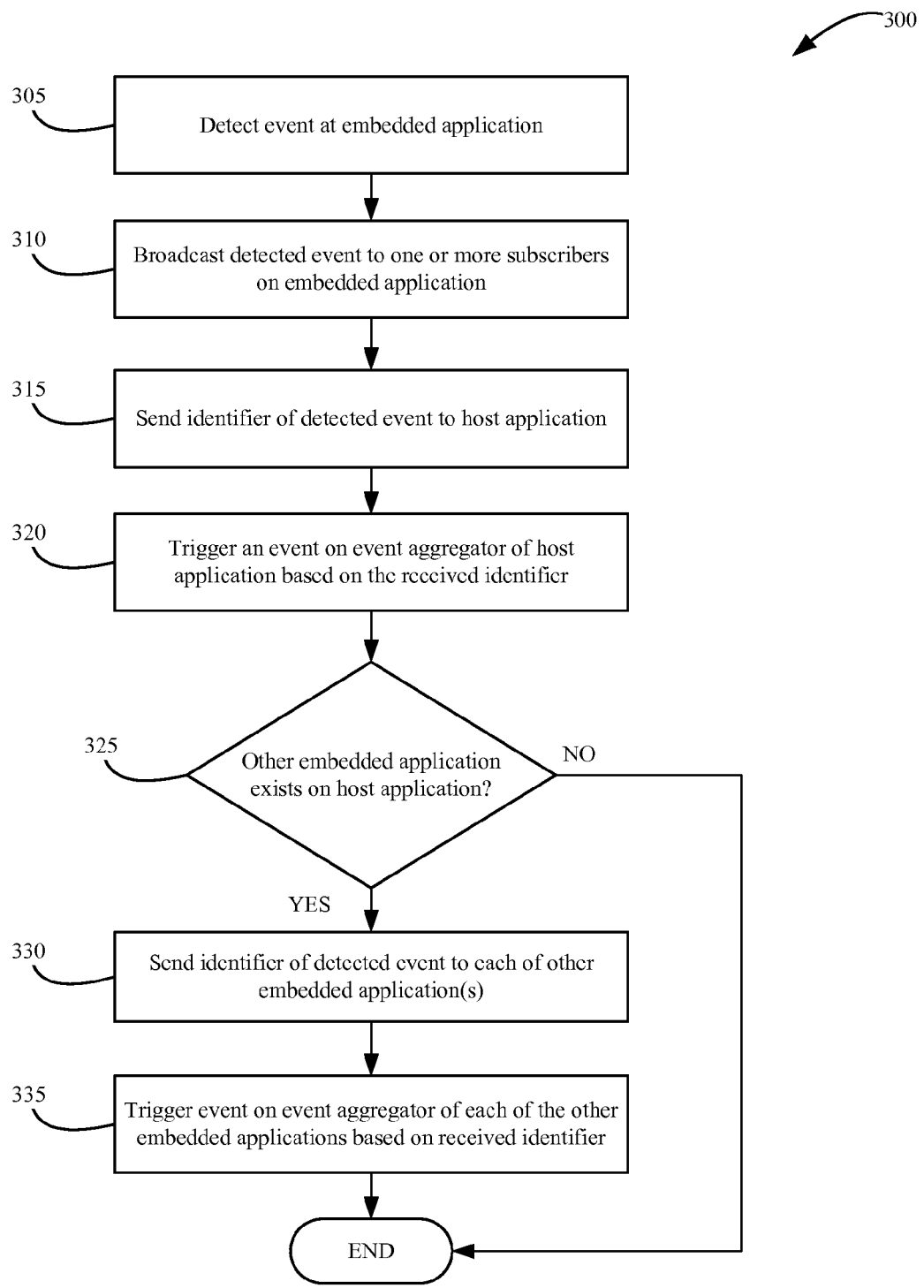
FIG. 3 shows one example flowchart of a method of communicating an event triggered from an embedded application to the host application and another embedded application in the example system of FIG. 1.

FIG. 3 shows one example flowchart of a method 300 of communicating or triggering an event from embedded application 110A to host application 105 and embedded application 110B in example system 100 of FIG. 1. Similar to FIG. 2, communicating the event initially triggered on embedded application 110A to host application 105 informs host application 105 of the event initially triggered or detected on embedded application 110A, allowing host application 105 to respond or react to the event detected. In addition, host application 105 may inform other embedded applications existing host application 105, such as embedded application 110B, of the event initially triggered or detected on embedded application 110A.

For illustrative purposes, example method 300 will continue to be described using host application 105 written in C# language and example embedded applications 110A, 110B being an HTML page and an Adobe® Flash® application, respectively. Host application 105 may perform the functions for displaying one or more thumbnails of images from an application server. Embedded application 110A may configured to receive a user request for uploading one or more images to the same application server, and embedded application 110B may be an application including a slideshow of the one or more uploaded images on the application server.

At block 305, event aggregator 115B may detect an event on the code space of embedded application 110A. Detecting the event on embedded application 110A may include determining an identifier of the event, such as a name of the event. For example, event aggregator 115B may detect an occurrence of an event having "UploadEvent" as an identifier, which is activated or triggered by a user pressing an "Upload" button in embedded application 110A. In some example aspects, event aggregator 115B may also obtain data upon detection of the event. For example, event aggregator 115B may also obtain an image file being attached to embedded application 110A, authentication information for the application server, an identifier of the image being uploaded, and/or metadata of the uploaded image, in response to the event associated with the "UploadEvent" identifier.

At block 310, event aggregator 115B may broadcast the detected event to subscribers 120B-125B. For example, event aggregator 115B may notify subscribers 120B-125B of the event raised on embedded application 110A. In some example aspects, event aggregator 115B of embedded application 110A may also broadcast the data associated with the detected event.

Event aggregator 115B may determine which of subscribers 120B-125B are configured or registered to receive the detected event. The determining may be performed by event aggregator 115B identifying which of subscribers 120B-125B have specified or opted to receive the detected event based on at least one of the identifier or a property of the event. For example, event aggregator 115B of embedded application 110A may determine which of subscribers 120B-125B are configured to receive events indicating an image upload request (i.e., events having the "UploadEvent" identifier). Subscribers 120B-125B registered or configured to receive the broadcasted event may then execute operations, such as one or more program functions associated with or based on the detected event, in response to the detected event.

At block 315, embedded application 110A may send the identifier of the detected event to host application 105. Embedded application 110A may also send the data associated with the detected event broadcasted by event aggregator 115B to host application 105. The identifier of the detected event and/or data obtained upon detection may be sent to the code space of host application 105. For example, embedded application 110A may notify host application 105 that an upload event has been detected by sending the identifier of the upload event, such as the "UploadEvent".

At block 320, event aggregator 115A of host application 105 may trigger an event based upon the received event identifier and/or associated event data. Triggering the event may include raising an event on event aggregator 115A and notifying subscribers 120A-125A of the detected event. Subscribers 120A-125A registered to receive the detected event may further execute operations in response to the received event.

The one or more operations may be, for example, establishing a connection with the application server to which the image has been uploaded, retrieving a copy of the image uploaded from the application server, coordinating with a display method or function in the code space of host application 105 to display the image retrieved as a thumbnail, or the like.

At block 325, host application 105 may determine whether any other embedded applications exist on host application 105 (in addition to embedded application 110A on which the event was initially detected to be raised). Upon a positive determination that host application 105 contains at least one other embedded application, host application 105 may transmit the identifier of the event detected by event aggregator 115B to each of the other embedded applications (in this example embodiment, embedded application 110B) at block 330. Host application 105 may also transmit the data associated with the detected event to each of the other embedded applications (in this example embodiment, embedded application 110B).

At block 335, the event aggregator (in this example embodiment 115C) of the other embedded applications may then trigger an event based on the received identifier. For example, in example system 100, event aggregator 115C of embedded application 110B may then trigger an event based on the received identifier. Triggering the event on event aggregator 115C may include notifying subscribers 120C-125C which are registered to receive the triggered event of the event occurrence. Subscribers 120C-125C registered or configured to receive the triggered event may then execute operations in response to the triggered event.

For example, upon determining that an Adobe® Flash® application (embedded application 110B) exists on host application 105 (written in C#) in addition to the HTML page (embedded application 110A), host application 105 sends the "UploadEvent" identifier to the Adobe® Flash® application or notifies the Adobe® Flash® application of the image upload event on the HTML page. Event aggregator 115C of the Adobe® Flash® application may receive the "UploadEvent" identifier and notify subscribers 120C-125C of the triggered event. For example, if subscriber 125C is registered to receive the event triggered by the "UploadEvent" identifier, the operation subscriber 125C may perform in response to the triggered event may be requesting the uploaded image from the application server.

If, at block 325, host application 105 determines that it contains no other embedded applications (i.e., a negative determination), no identifier of or data associated with the detected event is transmitted.

Example method 300 may be repeated in response to a subsequent triggering of a separate event.

It will be appreciated be those of ordinary skill in the art that in other example embodiments, example method 300 may be utilized to detect an event from any embedded application 110A-110B and communicated to host application 105 and, ultimately, to any other embedded applications existing on host application 105.

It will be appreciated that the actions described and shown in the example flowcharts may be carried out or performed in any suitable order. It will also be appreciated that not all of the actions described in FIG. 2 or FIG. 3 need to be performed in accordance with the example embodiments and/or additional actions may be performed in accordance with other example embodiments of the present disclosure.

Many modifications and other example embodiments of the disclosure set forth herein will come to mind to one skilled in the art to which this disclosure pertains having the benefit of the teachings presented in the foregoing description and the associated drawings. Therefore, it is to be understood that the present disclosure is not to be limited to the specific example embodiments disclosed and that modifications and other embodiments are intended to be included within the scope of the appended claims. Although specific terms are employed herein, they are used in a generic and descriptive sense only and not for purposes of limitation.

What is claimed is:

1. A non-transitory computer-readable storage medium storing instructions that, when executed by a computer, cause the computer to perform a method of communicating events, the method comprising:

detecting an event at a first application written in a first programming language, the first application being embedded in a host application written in a second programming language and running on a computing device;

initiating a broadcast of the detected event on an event aggregator in the host application;

determining, by the host application, whether a second application is embedded in the host application; and if the second application is determined to be embedded in the host application, transmitting the detected event from the host application to the second embedded application;

wherein transmitting the detected event comprises sending data associated with the detected event from the second embedded application to the host application, wherein the data associated with the detected event includes an identifier of the detected event;

determining by an event aggregator the first embedded application whether at least one operation is to be executed by the first embedded application in response to the received event; and upon a positive determination by the event aggregator in the first embedded application that the at least one operation is to be executed, executing on the first embedded application the at least one operation in response to the detected event.

2. The non-transitory computer-readable storage medium of claim 1, wherein a coding language of the first embedded application differs from at least one of a coding language of the host application and a coding language of the second embedded application.

3. The non-transitory computer-readable storage medium of claim 1, wherein the method performed further comprise, notifying a subscriber of the application of the detected event, the subscriber being a program function in the host application.

4. The non-transitory computer-readable storage medium of claim 1, wherein the transmitting of the detected event comprises sending data associated with the detected event from the host application to the second embedded application.

* * * * *